(12) United States Patent
Woerz et al.

(10) Patent No.: US 8,397,488 B2
(45) Date of Patent: Mar. 19, 2013

(54) METHOD FOR CLEANING INTERNAL COMBUSTION ENGINE EXHAUST GASES

(75) Inventors: Anke Woerz, Frankfurt (DE); Wilfried Mueller, Karben (DE); Martin Votsmeier, Weinheim (DE); Franz Dornhaus, Frankfurt a.M. (DE); Martin Roesch, Rodgau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 336 days.

(21) Appl. No.: 12/913,218

(22) Filed: Oct. 27, 2010

(65) Prior Publication Data

US 2011/0094207 A1  Apr. 28, 2011

(30) Foreign Application Priority Data

Oct. 28, 2009 (EP) .................................... 09013576

(51) Int. Cl.
*F01N 3/00* (2006.01)
(52) U.S. Cl. ............... 60/274; 60/295; 60/297; 60/299; 60/311; 422/177; 422/180; 423/239.1; 423/245.3
(58) Field of Classification Search ............... 60/274, 60/295, 297, 299, 311; 422/168, 177, 180; 432/239.1, 245.1, 245.3
See application file for complete search history.

(56) References Cited

U.S. PATENT DOCUMENTS

| | | | | |
|---|---|---|---|---|
| 7,097,817 B2* | 8/2006 | Brisley et al. | ............... | 423/245.3 |
| 7,211,226 B2* | 5/2007 | Liu et al. | ................. | 422/168 |
| 7,722,829 B2* | 5/2010 | Punke et al. | ............... | 422/180 |
| 7,875,573 B2* | 1/2011 | Beutel et al. | ................ | 502/339 |
| 8,011,177 B2* | 9/2011 | Cheng | .......................... | 60/286 |
| 8,276,371 B2* | 10/2012 | Wei | ............................... | 60/295 |
| 2006/0057046 A1 | 3/2006 | Punke et al. | | |
| 2009/0246098 A1 | 10/2009 | Endo et al. | | |

FOREIGN PATENT DOCUMENTS

| | | |
|---|---|---|
| EP | 1 250 952 | 10/2002 |
| EP | 2 022 563 | 2/2009 |
| WO | 2008/026861 | 3/2008 |

OTHER PUBLICATIONS

Votsmeier et al., "Wall-flow filters with wall-integrated oxidation catalyst: A simulation study", Science Direct, Applied Catalysis B: Enviromental 70, 2007, pp. 233-240.

\* cited by examiner

*Primary Examiner* — Binh Q Tran
(74) *Attorney, Agent, or Firm* — Smith, Gambrell & Russell, LLP (57) ABSTRACT

Described is a method for cleaning the exhaust gases of internal combustion engines, which method is suitable for reducing harmful gases and particle emissions. Here, the exhaust gas to be cleaned is conducted, under operating conditions, with a discontinuous profile of the air ratio $\lambda$ across a wall-flow filter substrate which comprises a catalytically active coating containing one storage material. The storage material is suitable for temporarily storing one or more exhaust-gas components under certain operating conditions and releasing said exhaust-gas components again in a targeted fashion in the event of a suitable change in the operating conditions. The coating is configured such that the component has a gradient of the storage material concentration and/or of the total coating amount, with the highest concentration of the storage material in the longitudinal direction of the component being present on the inflow side. At least 60% by weight of the storage material in relation to its total amount is present in the walls between inflow and outflow ducts, and at least 50% by weight of the storage material in relation to its total amount is present in a first, inflow-side zone in the wall-flow filter substrate.

11 Claims, 5 Drawing Sheets

| (I.a) | (II.a) | (III.a) |
|---|---|---|
| (I.b) 60 | (II.b) 20 | (III.b) 20 |
| (I.c) | (II.c) | (III.c) |

Figure 3

| (I.a) | (II.a) | (III.a) |
|---|---|---|
| (I.b) 37.5 | (II.b) 12.5 | (III.b) 12.5 |
| (I.c) 12.5 | (II.c) 12.5 | (III.c) 12.5 |

Figure 4

|        |        |         |
|--------|--------|---------|
| (I.a)  | (II.a) | (III.a) |
| (I.b) 50 | (II.b) 50 | (III.b) |
| (I.c)  | (II.c) | (III.c) |

Figure 5

|        |        |         |
|--------|--------|---------|
| (I.a) 14 | (II.a) | (III.a) |
| (I.b) 43 | (II.b) 43 | (III.b) |
| (I.c)  | (II.c) | (III.c) |

Figure 6

|        |        |         |
|--------|--------|---------|
| (I.a) 10 | (II.a) | (III.a) |
| (I.b) 30 | (II.b) 30 | (III.b) |
| (I.c) 10 | (II.c) 10 | (III.c) 10 |

Figure 7

| (I.a) | (II.a) | (III.a) |
|---|---|---|
| (I.b) 43 | (II.b) 43 | (III.b) |
| (I.c) | (II.c) | (III.c) 14 |

METHOD FOR CLEANING INTERNAL COMBUSTION ENGINE EXHAUST GASES

The invention relates to a method for cleaning the exhaust gases of internal combustion engines using a material which stores exhaust-gas components and using a particle filter, which method is particularly suitable for use in motor vehicles.

The exhaust gas of internal combustion engines in motor vehicles typically contains the harmful gases carbon monoxide (CO) and hydrocarbons (HC), nitrogen oxides ($NO_x$) and possibly sulphur oxides ($SO_x$), and also particles composed predominantly of soot residues and possibly adherent organic agglomerates. CO, HC and particles are products of the incomplete combustion of the fuel in the combustion chamber of the engine. Nitrogen oxides are generated in the cylinder from nitrogen and oxygen in the intake air if the combustion temperatures locally exceed 1000° C. Sulphur oxides result from the combustion of organic sulphur compounds which are always present in small quantities in non-synthetic fuels. To remove these emissions, which are harmful to the environment and to health, from the exhaust gases of motor vehicles, a multiplicity of catalytic exhaust-gas cleaning technologies have been developed, the basic principle of which is conventionally based on conducting the exhaust gas to be cleaned across a catalytic converter which comprises a throughflow honeycomb body and a catalytically active coating applied thereto. Said catalytic converter promotes the chemical reaction of different exhaust-gas components to form non-harmful products such as for example carbon dioxide $CO_2$ and water.

Here, the mode of operation and the composition of the catalytic converters used differ in part considerably according to the composition of the exhaust gas to be cleaned and according to the exhaust-gas temperature level to be expected at the catalytic converter. A multiplicity of the compositions used as a catalytically active coating contain components in which one or more exhaust-gas components are temporarily bound under certain operating conditions, wherein said exhaust-gas components can be released again in a targeted fashion in the event of a suitable change in the operating conditions. Such components are referred to generally below as storage material.

For example, oxygen storage materials are used in three-way catalytic converters in order to remove CO, HC and $NO_x$ from the exhaust gas of petrol engines (spark-ignition engines) operated with an on average stoichiometric air/fuel mixture. The known oxygen storage materials are cerium-zirconium mixed oxides which may be doped with further oxides, in particular with rare-earth metal oxides such as for example lanthanum oxide, praseodymium oxide, neodymium oxide or yttrium oxide.

To remove nitrogen oxides from the exhaust gas of internal combustion engines operated with a predominantly lean air/fuel mixture (diesel engines or lean-burn spark-ignition engines), use may be made of nitrogen oxide storage catalytic converters. Nitrogen oxide storage catalytic converters contain nitrogen oxide storage materials which store nitrogen oxides from the lean exhaust gas and can release said nitrogen oxides again, and supply them for catalytic reduction to form nitrogen, under reducing exhaust-gas conditions. Nitrogen oxide storage materials usually contain basic oxides, hydroxides, oxyhydroxides and/or carbonates of the alkali metals, of the earth alkali metals and/or of the rare-earth metals. Use is preferably made of oxides, hydroxides, oxyhydroxides and/or carbonates of potassium, of sodium, of strontium, of barium, of lanthanum and of cerium.

Three-way catalytic converters, which contain oxygen storage material, and nitrogen oxide storage catalytic converters, which contain a $NO_x$ storage material, have in common that they are operated under conditions with a discontinuous profile of the air ratio $\lambda$. They are subjected in a defined way to a periodic change in the air ratio $\lambda$ and therefore to a periodic change of oxidizing and reducing exhaust-gas conditions. Said change in the air ratio $\lambda$ is in both cases essential for the exhaust-gas cleaning result.

In the case of the three-way catalytic converter, the lambda value of the exhaust gas is regulated with a very short cycle time (approximately 0.5 to 5 Hertz) and an amplitude $\Delta\lambda$ of $0.005 \leq \Delta\lambda \leq 0.05$ about the value $\lambda=1$ (reducing and oxidizing exhaust-gas constituents are present in a stoichiometric ratio relative to one another). On account of the dynamic mode of operation of the engine in the vehicles, deviations from said state arise. In order that said deviations do not have an adverse effect on the exhaust-gas cleaning result as the exhaust gas is conducted across the three-way catalytic converter, oxygen storage materials contained in the catalytic converter compensate said deviations to a certain degree in that they absorb oxygen out of the exhaust gas or discharge oxygen into the exhaust gas as required.

As described in detail for example in SAE 950809, nitrogen oxide storage catalytic converters are operated for several seconds in lean exhaust gas ($\lambda>2$), and during this time absorb nitrogen oxides, which cannot be reduced under lean conditions, in the nitrogen oxide storage material while CO and HC are oxidized with the oxygen contained in the exhaust gas to form $CO_2$ and water. If the nitrogen oxide store becomes full, the nitrogen oxide storage catalytic converter must be regenerated by switching to rich operating conditions ($\lambda<0.9$). During said operating phase, the nitrogen oxides are released from the storage material again and react with the reductive components CO and HC contained in the exhaust gas, with the formation of $CO_2$ and $H_2O$, to form nitrogen.

The abovementioned storage materials are conventionally a constituent part of catalytically active coatings applied to throughflow honeycomb bodies. To clean diesel exhaust gases, and increasingly also to clean the exhaust gases of spark-ignition engines, the removal of particle emissions is also necessary in addition to the reduction of harmful gas components. Here, to keep the number of exhaust-gas cleaning units as low as possible, and to therefore be able to provide the most cost-effective and fuel-saving method possible, use is being made ever more frequently of catalytically active particle filters. These are usually ceramic wall-flow filter substrates which contain a catalytically active coating. Said coating may be applied, in the inflow and/or in the outflow ducts, to the wall and/or in the wall between the inflow and outflow ducts.

It has been observed that, under operating conditions with a discontinuous profile of the air ratio $\lambda$, catalytically activated particle filters which contain a catalytically active coating with a storage material have a considerably poorer storage efficiency than correspondingly coated throughflow honeycomb bodies. In the case of the catalytically coated wall-flow filter substrates, the deficit in the storage efficiency cannot simply be compensated by means of a linear increase in the coating amount. Such an approach would lead to an unacceptable rise in the exhaust-gas pressure loss across the coated filter.

The present invention was therefore based on the object of providing a method, which is improved in relation to the prior art, for reducing harmful gases and particle emissions in the exhaust gas of internal combustion engines, which method, to achieve the exhaust-gas cleaning objects, uses at least one storage material, makes do overall with the fewest possible exhaust-gas cleaning units, and does not have the above-described disadvantages under operating conditions with a discontinuous profile of the air ratio λ.

To achieve said object, the inventors initially carried out tests to determine how a throughflow honeycomb body coated with a storage material and a wall-flow filter substrate coated with a storage material differ in terms of their storage efficiency. In simulation calculations, the flow conditions in a coated throughflow honeycomb body [62 cells per cm², 0.1 mm wall thickness; layer thickness of the applied coating: 60 μm] and in a homogeneously coated wall-flow monolith [46.5 cells per cm²; 0.33 mm wall thickness] were regulated and the storage efficiencies of the components under conditions relevant to operation [spatial velocity: 37500 h⁻¹, temperature: 400° C.] were compared. The simulation model used here solves the balance equation for the concentrations in a representative section comprising in each case one inflow and one outflow duct and the wall between the two ducts. Such a model is described in detail in Votsmeier et al., "Wall-flow filters with wall-integrated oxidation catalysts: A simulation study", *Appl. Catal.* B 70 (2007) 233.

The cited reference addresses catalytic reactions without storage effects. To represent storage effects in the wall (for example oxygen store), an additional balance equation for the components stored in the wall is solved. Because neither diffusion nor convection need be taken into consideration for the stored components, the balance equation simplifies to:

$$\frac{\partial C_{stored}}{\partial t} = r \tag{1}$$

r denotes the reaction rate of the corresponding storage reaction. The same reaction rate also applies in the balance equation for the gaseous components in the filter wall:

$$0 = -\nabla \cdot (cu) + \nabla \cdot (D \nabla c) - r \tag{2}$$

For the explanation of the other variables in equation 2, reference is made to the reference literature cited above. In the specified examples, the reaction rate is calculated as follows:

$$r = k \cdot c_g \cdot (C_{max} - C_{stored}) \tag{3}$$

In said equation, $c_g$ is the dimensionless gas phase concentration, normalized with respect to the inflow concentration, for example of oxygen, $C_{stored}$ denotes the concentration of stored components in the wall, and $C_{max}$ denotes the maximum storage capacity of the wall. $C_{stored}$ and $C_{max}$ are likewise dimensionless, and are specifically specified relative to the inlet concentration of the gas phase component.

To be able to calculate the storage efficiency, the following parameters have been assumed:

| Parameter: | Throughflow monolith: | Wall-flow monolith: |
| --- | --- | --- |
| Diffusion coefficient of the exhaust gas: | In the coating: $3*10^{-6}$ m²/s | In the wall: $1*10^{-5}$ m²/s |
| Reaction speed constant k: | 100 s⁻¹ | 100 s⁻¹ |
| $C_{max}$: | 182 | 111 |

As a result, it was established that, in a throughflow monolith coated with storage material, approximately 10% of the storage material remains unutilized if the exhaust-gas component to be stored breaks through the catalytic converter. In a wall-flow monolith homogeneously coated with a corresponding quantity of storage material, at least 25% of the storage material remains unutilized under similar conditions.

Figures 1, 1A, 1B, 1C:
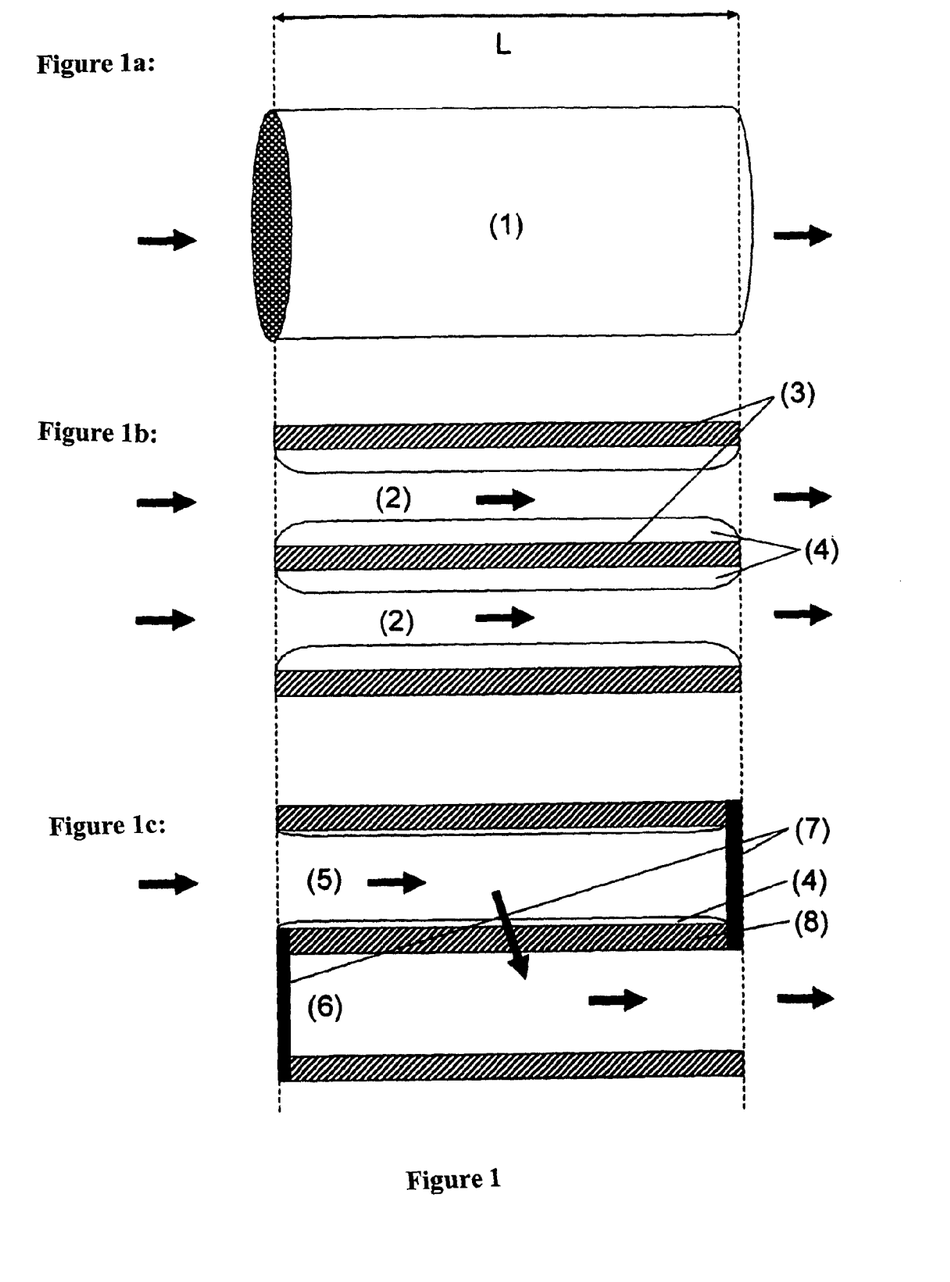
FIG. 1: shows an overview FIG. (1*a*) of a honeycomb body of length L (1) and a comparative schematic illustration of the flow conditions in a homogeneously coated throughflow monolith (1*b*) and in a homogeneously coated wall-flow filter substrate according to the prior art (1*c*)
FIG. 1*b* shows a longitudinal section through two parallel flow ducts (2) in a homogeneously coated throughflow monolith of length L, which flow ducts (2) are separated from one another by substantially gas-tight walls (3) to which the storage-material-containing, catalytically active coating is applied.
FIG. 1*c* shows a longitudinal section through an inflow duct (5) and an outflow duct (6) in a homogeneously coated wall-flow monolith of length L according to the prior art, in which the flow ducts are alternately closed off by gas-tight closures (7) and in which the coating (4) is applied at the inflow duct side into the gas-permeable wall (8).

In both cases, consideration was given to a homogeneously coated component, with the coating of the wall-flow filter substrate having been introduced into the wall at the inflow-duct side (FIG. 1a: overview figure; FIG. 1b: longitudinal section through two parallel flow ducts in a homogeneously coated throughflow monolith of length L; FIG. 1c: longitudinal section through the inflow and outflow duct in a homogeneously coated wall-flow monolith of length L).

Surprisingly, it was established that the utilization of the storage material in the coated wall-flow filter substrate can be improved considerably if the coating containing the storage material is introduced into the wall-flow filter substrate inhomogeneously in a defined way. Here, the coating containing the storage material should be applied such that a gradient of the storage material concentration and/or of the total coating amount is formed, with the highest concentration of the storage material in the longitudinal direction of the component being present on the inflow side. To ensure as high a storage efficiency as possible, the coating containing the storage material must be present predominantly in the wall between the inlet and outlet ducts.

In conjunction with the characteristic exhaust-gas flow in a wall-flow filter substrate, it is ensured by means of said type of coating that exhaust gas to be cleaned which enters into the particle filter comes into direct contact with the greatest possible amount of the storage material before emerging out of the filter. The exhaust gas to be cleaned is "forced" to flow through the coating regions with the greatest storage material concentration by the prevailing flow conditions in the wall-flow filter substrate. In this way, the proportion of storage material which remains unutilized is considerably reduced.

The object on which the invention is based is consequently achieved by means of a method for reducing harmful gases and particle emissions in the exhaust gas of internal combustion engines which contains oxygen ($O_2$) in addition to hydrocarbons (HC), carbon monoxide (CO), nitrogen oxides ($NO_x$) and particles, in which method the exhaust gas to be cleaned is conducted, under operating conditions, with a discontinuous profile of the air ratio λ across a wall-flow filter substrate of length L having inhomogeneous coating. Said wall-flow filter substrate having a multiplicity of ducts which run in the longitudinal direction and which are formed by walls which run in the longitudinal direction and which delimit and form the ducts. The ducts comprise inflow ducts with an open inlet end and a closed outlet end and outflow ducts with a closed inlet end and an open outlet end. Introduced into the wall-flow filter substrate is a catalytically active coating containing at least one storage material, with at least 60% by weight of the storage material in relation to its total amount being present in the walls between inflow and outflow ducts, and with at least 50% by weight of the storage material in relation to its total amount being present in a first, inflow-side zone in the wall-flow filter substrate, which first, inflow-side zone extends from the inlet end towards the outlet end and the length of which first inflow-side zone corresponds to at most ⅔ of the length of the wall-flow filter substrate. One or more exhaust-gas components can be bound in the storage material under certain operating conditions, which exhaust-gas components can be released again from said storage material in the event of a suitable change in the operating conditions.

In the wall-flow filter substrate according to the invention to be used for carrying out the method, it is preferable for at least 75% by weight of the storage material in relation to its total amount to be present in the inflow-side zone, the length of which corresponds to at most ⅔ of the length of the wall-flow filter substrate. The storage efficiency is also improved if at least 30% by weight, particularly preferably 40 to 50% by weight, of the storage material in relation to its total amount is present in a first, inflow-side zone which extends from the inlet end in the direction of the outlet end and the length of which corresponds to at most ⅓ of the length of the wall-flow filter substrate. By means of said adaptations of the storage material concentration to the force flow of the exhaust gas to be cleaned in the component, the utilization of the store is successively improved. Said improvements are explained in more detail below on the basis of special embodiments with the aid of FIGS. 3 to 8.

Within the context of this document, a discontinuous λ profile is to be understood to mean that, during the operation of the component according to the invention, an approximately constant λ value is not set, rather periodic changes in the air ratio λ are generated. Such conditions arise for example if a periodic change from oxidizing ("lean") and reducing ("rich") exhaust-gas conditions ("rich/lean change") occurs in the coated wall-flow filter substrate according to the invention, that is to say the air ratio changes periodically between a value λ>1 and a value λ<1. Here, both the cycle times of the rich/lean change and also the maximum deviations in the λ value (Δλ) may vary significantly. In a particularly preferred embodiment of the method, the air ratio changes periodically between a value of $1 \leq \lambda \leq 1.05$ in the lean range and a value of $1 \geq \lambda \geq 0.95$ in the rich range with a frequency of 0.5 to 5 Hertz. Rich/lean changes of said type occur in the exhaust gas of petrol engines (spark-ignition engines) which are operated on average with a stoichiometric air/fuel mixture. To clean the exhaust gases generated by said engines using the method according to the invention, use is preferably made of a catalytically active particle filter with a coating containing an oxygen storage material.

The advantages of the method according to the invention are particularly pronounced if the air ratio λ deviates more significantly from λ=1 in a transient operating state of the engine. In said case, the oxygen storage capability of the storage material is utilized to dampen the deviations. If effectively less storage material is available, then the oxygen buffer required for damping from the storage material is lower, and undesired pollutant breakthroughs through the exhaust-gas cleaning component occur at an earlier time.

Furthermore, it is conventional to use the oxygen storage capability of an exhaust-gas cleaning component as a measure for its catalytic activity and thus provide the "On Board Diagnostic" (OBD) which is legally required for motor vehicles with petrol engines operated on average stoichiometrically. Here, a change is targetedly made between rich and lean air/fuel mixture, and in so doing the oxygen storage capability of the exhaust-gas cleaning component is determined. If the theoretically present oxygen storage capability of the component is systemically utilized only insufficiently, this hinders the analysis of the data which can be obtained in the OBD.

In another particularly preferred embodiment of the method according to the invention, the air ratio λ changes periodically between the value of $1 \leq \lambda \leq 20$ and the value of $1 \geq \lambda \geq 0.85$. Here, the lean phase with $1 \leq \lambda \leq 20$ is longer in the regulating cycle by several seconds than the rich phase with $1 \geq \lambda \geq 0.85$. Such rich/lean conditions occur in exhaust gases of diesel or spark-ignition engines which are operated with a predominantly lean air/fuel mixture. To clean the exhaust gases generated by said engines by the method according to the invention, use is preferably made of a particle filter with a catalytically active coating containing one or more nitrogen oxide storage materials.

The catalytically active particle filter according to the invention for carrying out the method according to the invention comprises a wall-flow filter substrate and a catalytically active coating which contains a storage material and which has a gradient of the storage material concentration and/or of the total coating amount, with the highest concentration of the storage material in the longitudinal direction of the component being situated on the inflow side. This is configured such that at least 60% by weight of the storage material in relation to its total amount is present in the walls between inflow and outflow ducts, with at least 50% by weight of the storage material in relation to its total amount being present in a first, inflow-side zone which extends from the inlet end towards the outlet end whose length corresponds to at most ⅔ of the length of the wall-flow filter substrate.

Figure 2:
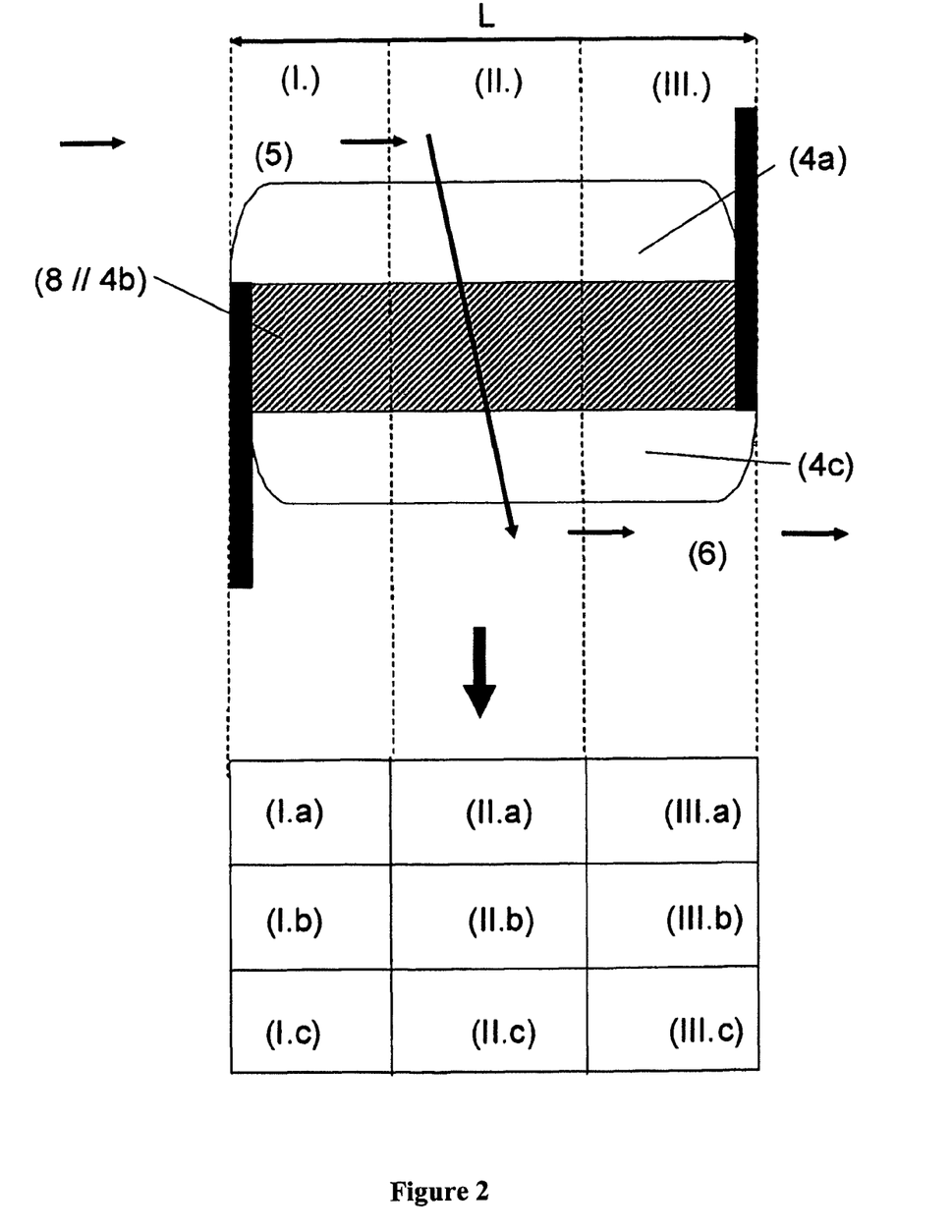
FIG. 2: shows the schematic illustration of the porous wall (8) between an inflow duct (5) and an outflow duct (6) in a wall-flow monolith which is provided with an in-wall coating (4*b*), an inflow-duct-side on-wall coating (4*a*) and an outflow-duct-side on-wall coating (4*c*), and the schematic division thereof into nine segments for the illustration of preferred embodiments.

Some preferred embodiments are shown schematically in FIGS. 3 to 8. Illustrated in each case is the wall (8) between an inlet duct (5) and an outlet duct (6) of the wall-flow filter, which wall (8) may contain a coating in the pores of the wall (4b), situated on the wall at the inlet duct side (4a) or situated on the wall at the outlet duct side (4c). For better illustration of the graduation of the storage material, the component is divided in length into three segments, with segment (I.) being arranged at the inflow side in the flow direction of the exhaust gas, segment (III.) being arranged at the outflow side in the flow direction of the exhaust gas, and segment (II.) being situated between segments (I.) and (III.). The distinction between three layer segments (4a/4b/4c) and three zone segments (I./II./III.) yields an illustration with a total of nine segments [I.a/II.a/III.a for the inlet-duct-side coating (on the wall), I.b/II.b/III.b for the coating in the wall and I.c/II.c/III.c for the outlet-duct-side coating (on the wall), see FIG. 2], by means of which illustration the graduation of the storage materials in the preferred embodiments of the component according to the invention can be illustrated in a simple manner.

FIGS. 3 to 8 show the preferred embodiments of the filter according to the invention in said schematic illustration. Said figures illustrate the percentage amounts of storage material in percent by weight in relation to the total amount of storage material present in the component. Segments not containing a number contain no storage material, or no storage-material-containing coating.

Figure 3:
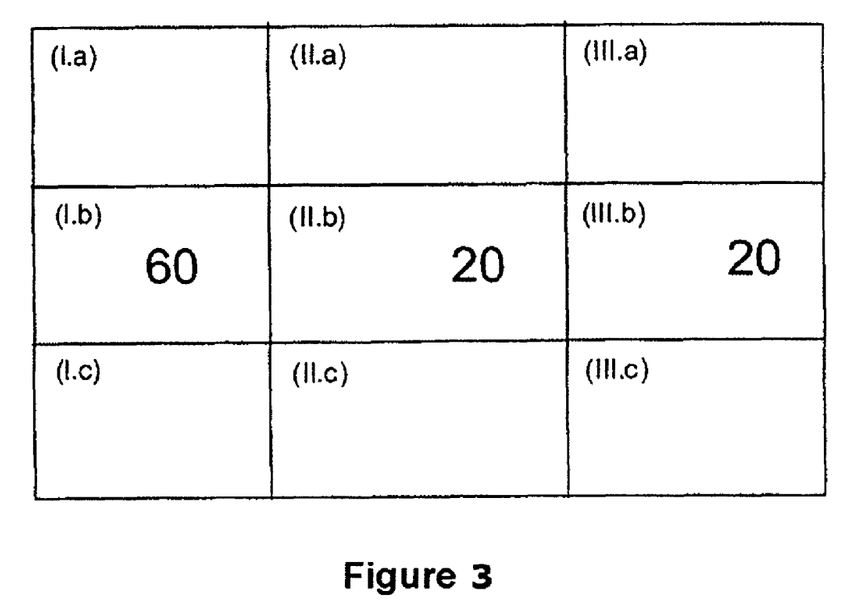
FIGS. 3 to 8: show schematic illustrations of the storage material distribution in preferred embodiments of the filter according to the invention.

FIG. 3 shows an embodiment of the component according to the invention in which the entire storage-material-containing coating is present in the wall between the inflow and outflow ducts, with (60+20) % by weight, that is to say 80% by weight of the storage material in relation to its total amount being present in an inflow-side zone, the length of which amounts to ⅔ of the total length of the filter substrate. In contrast to a corresponding filter substrate with homogeneous distribution of the storage material in the wall, in which only approximately 75% of the store is utilized, the utilization of the storage material in a component of said type is 83%. To produce said embodiment, it is possible to use all common standard methods, which are known to a person skilled in the art, for in-wall coating of zones in wall-flow filter substrates (dipping methods; suction/pressure techniques).

Figure 4:
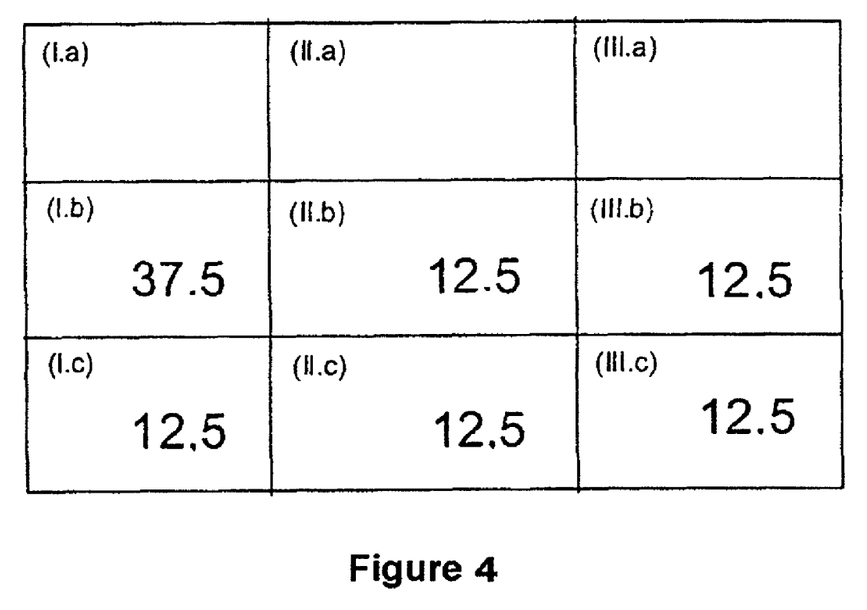

If, in the embodiment shown in FIG. 3, slightly more than one third (3×12.5%=37.5%) of the total amount of the storage material is removed from the wall and replaced by an on-wall coating in the outflow ducts with a homogeneous storage material distribution, one arrives at the embodiment illustrated in FIG. 4. A component of said type has yet further improved storage material utilization of 85%, but the production of a component of said type requires a combination of on-wall and in-wall coating, and therefore an additional coating step.

Figure 5:
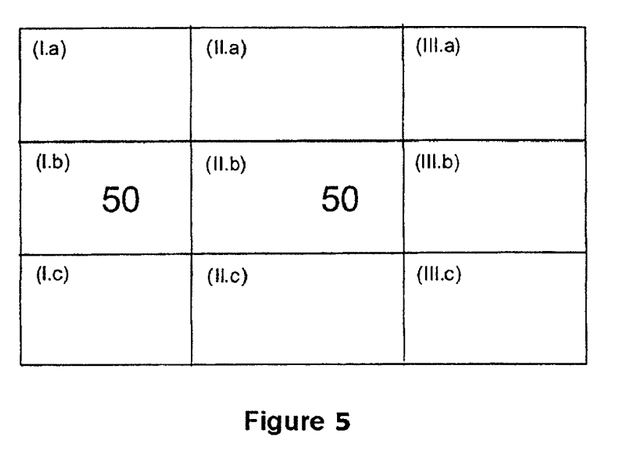
Figure 6:
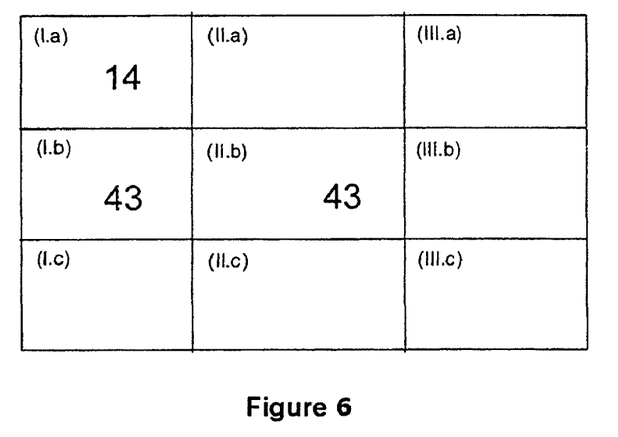
Figure 7:
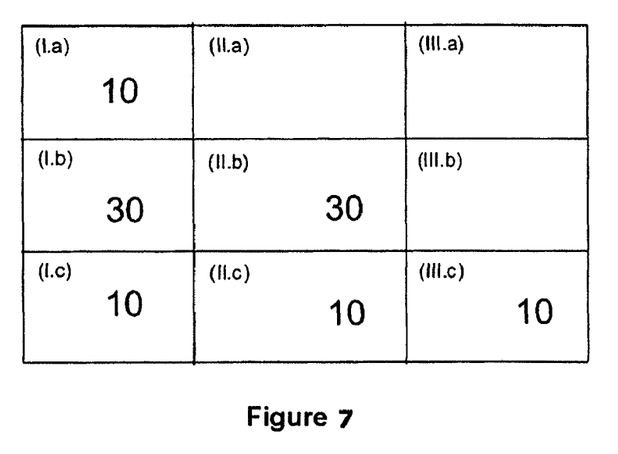

FIG. 5 likewise shows an embodiment according to the invention with complete in-wall coating. In said embodiment, the storage material is situated entirely in an inflow-side zone, the length of which corresponds to ⅔ of the length of the filter substrate. A component of said type has the advantage over the embodiment shown in FIG. 3 that the coating can be applied in a single coating step. As a result of complete lack of storage material in the final, outflow-side third of the wall, however, breakthroughs of the exhaust-gas component to be stored occur to a greater extent. In said embodiment, the utilization of the storage material is 81.5%.

If only 14% of the storage material present in the first two zones is applied as an additional-inflow-side zone in the form of an on-wall coating in the inflow ducts (FIG. 6), the utilization of the storage material is improved to 84%. A further re-distribution of the storage material into an additional outflow-side, homogeneous on-wall coating (FIG. 7) leads to a further improvement to 90.5%.

Figure 8:
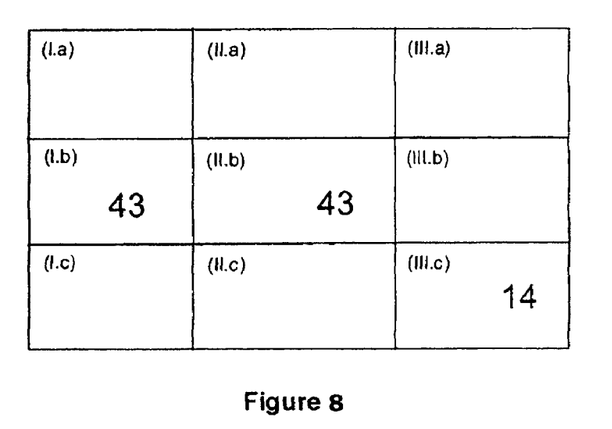

The best results are however obtained if, as shown in FIG. 8, the predominant part of the storage material is distributed in the wall in an inflow-side zone (⅔ of the length of the filter substrate), more precisely in segments I.b and II.b, and this is supplemented by a short outflow-side zone coating (⅓ of the length of the filter substrate) on the wall in the outlet duct (segment III.c). In said arrangement, the storage material present in the coated wall-flow filter is utilized more efficiently than in the homogeneously coated throughflow monolith. In this most suitable embodiment, the proportion of unutilized storage material is only 8%, that is to say the storage material utilization is increased to 92%. Furthermore, since the main part of the coating is present in the wall, said embodiment is distinguished by excellent dynamic pressure characteristics and is easy to produce in two coating steps using conventional coating methods known to a person skilled in the art.

Exhaust gases of petrol engines which are operated with an on average stoichiometric air/fuel mixture have, with a periodic change between $1 \leq \lambda \leq 1.05$ in the lean range and $1 \geq \lambda \geq 0.95$ in the rich range, a relatively narrow width of the set air ratio range. Particularly suitable here for carrying out the method according to the invention is a particle filter whose catalytically active coating contains an oxygen storage material. As an oxygen storage material of said type, use is preferably made of a cerium-zirconium mixed oxide. In particularly preferred embodiments, the cerium-zirconium mixed oxide is doped with further rare-earth metal oxides selected from the group consisting of yttrium oxide, lanthanum oxide, praseodymium oxide, neodymium oxide and mixtures thereof.

Small quantities of a noble metal such as platinum, palladium, rhodium, ruthenium and/or gold are preferably applied to the oxygen storage material. Furthermore, the coating may contain further noble metals selected from the group consisting of platinum, palladium, rhodium, ruthenium, gold or mixtures thereof, which may preferably be applied to a further, large-surface-area refractory support oxide such as for example aluminium oxide, cerium oxide, zirconium oxide or mixtures thereof.

Exhaust gases from diesel engines or from petrol engines which are operated with a predominantly lean air/fuel mixture have a periodic change between $1 \leq \lambda \leq 20$ in the lean range and $1 \geq \lambda \geq 0.85$ in the rich range, with the lean phase being longer in the regulating cycle by several seconds than the rich phase. In this case, the air ratio thus varies over a relatively large range. The particle filter according to the invention must therefore have excellent oxidation-catalytic properties and at the same time excellent reduction-catalytic properties. Particularly suitable for carrying out the method according to the invention is a particle filter according to the invention whose catalytically active coating contains a nitrogen oxide storage material which preferably contains one or more nitrogen oxide storage components selected from the group of oxides, hydroxides, oxyhydroxides and carbonates of the alkali metals, of the earth alkali metals and of the rare-earth metals. To provide adequate oxidation-catalytic properties, the coating also preferably contains platinum and/or palladium. To improve the reduction-catalytic properties of the component according to the invention and in particular to promote the $NO_x$ reduction to form nitrogen after the desorption thereof out of the nitrogen oxide storage material during the rich phase, preferred embodiments also contain palladium and/or rhodium.

To carry out the method according to the invention, an exhaust gas which is correspondingly to be cleaned is conducted, under operating conditions with a discontinuous profile of the air ratio $\lambda$, across a component according to the invention as described above. As a result of the improvement in storage efficiency obtained in relation to the homogeneously coated particle filter by means of the graduated arrangement according to the invention of the storage efficiency over the component, it is possible to reduce the total coating amount and to therefore reduce the exhaust-gas back pressure generated by the component in relation to a conventional filter coated with storage material and with the same storage capacity. In this way, fuel consumption and power losses, which are not uncommonly a result of the use of coated particle filters, can be avoided while obtaining an excellent cleaning action. Alternatively, the improved storage efficiency permits the use of a smaller filter volume.

The following figures and examples are intended in particular to further illustrate the catalytically active particle filter used for carrying out the method according to the invention. In the figures.

The improvement in storage efficiency by applying an inhomogeneous coating could be shown using filters coated with oxygen storage material. For corresponding tests, three wall-flow filter substrates composed of cordierite with a diameter of 14.37 cm, a length of 15.24 cm, a cell density of 46.5 cells/cm$^2$ and a cell wall thickness of 12 μm were provided with in each case g/L (in relation to the volume of the wall-flow filter substrate) of a coating suspension of the following composition:

1 g/L strontium oxide
 1 g/L lanthanum oxide
 41 g/L aluminium oxide stabilized with 3% by weight of lanthanum
 18 g/L cerium/zirconium mixed oxide containing 50% by weight of $ZrO_2$
 18 g/L cerium/zirconium mixed oxide containing 70% by weight of $ZrO_2$
 0.12 g/L rhodium from rhodium nitrate
 1.3 g/L palladium from palladium nitrate To produce the coating suspension, the aluminium oxide stabilized with lanthanum and the cerium/zirconium mixed oxides were suspended in water. While stirring, firstly strontium hydroxide and lanthanum oxide, then rhodium and palladium nitrate solution were added. The coating suspension thereby obtained was ground and introduced into the wall-flow filter substrates using a conventional coating process (suction/pressure technique) familiar to a person skilled in the art. After the application of the coating, the filter substrates were dried in hot air and then calcinated in air at 500° C. for a duration of 2 hours.

COMPARISON EXAMPLE VPF

To produce a comparison example according to the prior art, 80 g/L of the above-described coating suspension in relation to the volume of the wall-flow filter was introduced homogeneously at the inflow side into the wall between the inflow and outflow ducts over the entire length of the wall-flow filter substrate.

EXAMPLE 1

To produce a first filter PF1 according to the invention, firstly 48 g/L of the above-described coating suspension in relation to the total volume of the wall-flow filter was introduced homogeneously at the inflow side into the wall between the inflow and outflow ducts over the entire length of the wall-flow filter substrate. After drying and intermediate calcination, a further 32 g/L (in relation to the total length of the component) of the coating suspension was introduced into the wall between the inflow and outflow ducts in an inflow-side zone whose length corresponded to ⅓ of the total length of the component. This yielded a filter PF1 according to the invention corresponding to FIG. 3, containing 80 g/L of the above-described coating suspension.

EXAMPLE 2

To produce a further filter PF2 according to the invention, firstly 68.8 g/L of the above-described coating suspension in relation to the total volume of the wall-flow filter was introduced homogeneously at the inflow side into the wall between the inflow and outflow ducts in an inflow-side zone whose length corresponded to ⅔ of the total length of the wall-flow filter substrate. After drying and intermediate calcination, a further 11.2 g/L of the coating suspension in relation to the total volume of the wall-flow filter was applied as an on-wall coating into the outflow ducts as an outflow-side zone whose length corresponded to ⅓ of the total length of the component. This yielded a filter PF2 according to the invention corresponding to FIG. 8, containing 80 g/L of the above-described coating suspension.

The filters VPF, PF1 and PF2 produced as described were tested on an engine test stand with real exhaust gas of an engine operated with an on average stoichiometric air/fuel mixture. A 15-minute conditioning at λ=0.95 was firstly carried out, wherein the operating point of the engine was selected such that the exhaust-gas temperature at the inlet of the filter was approximately 600° C. and the spatial velocity of the exhaust gas was approximately 200 kg/h. After conditioning, the oxygen storage capability of the coated filter was determined. For this purpose, a so-called "step test" was carried out, in which the air ratio λ was varied between 0.96 and 1.04 ("λ step"). Here, the operating point of the engine was selected such that the exhaust-gas temperature at the inlet of the filter was 470° C. and the spatial velocity was 60 kg/h. In said test, the stored oxygen quantity was determined as an average value over a plurality of rich-lean steps. The method for carrying out and evaluating such "λ step tests" is known in the prior art and familiar to a person skilled in the art in the field of three-way catalytic converters.

Figure 9:
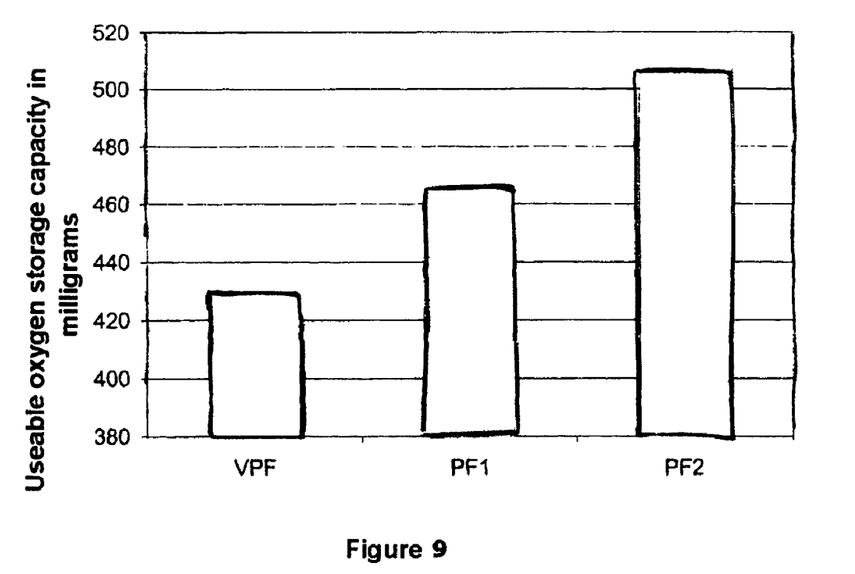
FIG. 9: shows the results for determining the usable oxygen storage capacity of a wall-flow filter substrate of the prior art (VPF) coated homogeneously with oxygen storage material, and two wall-flow filter substrates according to the invention (PF1 according to FIG. 3 and PF2 according to FIG. 8) which were inhomogeneously coated with oxygen storage material.

FIG. 9 shows the results obtained in the step test for the coated filter according to the prior art VPF and the two particle filters PF1 and PF2 according to the invention. Illustrated is the averaged quantity of stored oxygen in milligrams (also "OSC quantity"; corresponds to the usable oxygen storage capacity in the component) which could be observed during the λ steps.

The particle filter according to the prior art VPF 1 exhibited a usable oxygen storage capacity of approximately 430 mg. The filter according to the invention PF1, which had only an in-wall coating with a considerable enrichment of the storage material in a first, inflow-side zone corresponding to the illustration in FIG. 3, exhibited a usable oxygen storage capacity (approx 465 mg) greater in relation thereto by approximately 8%. The greatest usable oxygen storage capacity was observed in the particle filter PF2 according to the invention produced according to FIG. 8. The usable oxygen storage capacity of said particle filter PF2 was approximately 505 mg and therefore exceeded the usable oxygen storage capacity of the homogeneously coated comparison filter according to the prior art VPF by approximately 17%.

It was therefore possible for the results obtained initially by simulation calculations to be confirmed in tests on the engine test stand, and it was possible to demonstrate a considerable improvement in the storage efficiency of the filter according to the invention in relation to conventional, homogeneously coated filters.

The invention claimed is:

1. Method for reducing harmful gases and particle emissions in the exhaust gas of internal combustion engines which contains oxygen ($O_2$) in addition to hydrocarbons (HC), carbon monoxide (CO), nitrogen oxides ($NO_x$) and particles,
   in which method the exhaust gas to be cleaned is conducted, under operating conditions, with a discontinuous profile of the air ratio λ across a wall-flow filter substrate of length L,
   with the wall-flow filter substrate having a multiplicity of ducts which run in the longitudinal direction and which are formed by walls which run in the longitudinal direction and which delimit and form the ducts, and the ducts comprise inflow ducts with an open inlet end and a closed outlet end and also outflow ducts with a closed inlet end and an open outlet end, which wall-flow filter substrate comprises a catalytically active coating containing at least one storage material, with at least 60% by weight of the storage material in relation to its total amount being present in the walls between inflow and outflow ducts, and with at least 50% by weight of the storage material in relation to its total amount being present in a first, inflow-side zone in the wall-flow filter substrate, which first, inflow-side zone extends from the inlet end towards the outlet end and the length of which first inflow-side zone corresponds to at most ⅔ of the length of the wall-flow filter substrate, and with one or more exhaust-gas components being bound in the storage material under certain operating conditions, which exhaust-gas components can be released again from said storage material in the event of a suitable change in the operating conditions.

2. Method according to claim 1,
characterized
in that at least 30% by weight of the storage material in relation to its total amount is present in a first, inflow-side zone in the wall filter substrate, which first, inflow-side zone extends from the inlet end in the direction of the outlet end, and with the length of said zone corresponding to at most ⅓ of the length of the wall-flow filter substrate.

3. Method according to claim 1 or 2,
characterized
in that the air ratio $\lambda$ changes periodically between a value $\lambda > 1$ and a value $\lambda < 1$.

4. Method according to claim 3,
characterized
in that the air ratio $\lambda$ changes periodically between a value of $1 \leq \lambda \leq 1.05$ and a value of $1 \geq \lambda \geq 0.95$ with a frequency of 0.5 to 5 Hertz.

5. Method according to claim 3,
characterized
in that the air ratio $\lambda$ changes periodically between the value of $1 \leq \lambda \leq 20$ and the value of $1 \geq \lambda \geq 0.85$, with the lean phase with $1 \leq \lambda \leq 20$ being longer in the regulating cycle by several seconds than the rich phase with $1 \geq \lambda \geq 0.85$.

6. Catalytically active particle filter comprising a wall-flow filter substrate and a catalytically active coating for carrying out the method according to claim 1.

7. Catalytically active particle filter comprising a wall-flow filter substrate and a catalytically active coating for carrying out the method according to claim 4,
characterized
in that the catalytically active coating contains an oxygen storage material.

8. Catalytically active particle filter according to claim 7,
characterized
in that the oxygen storage material is a cerium-zirconium mixed oxide.

9. Catalytically active particle filter according to claim 8,
characterized
in that the cerium-zirconium mixed oxide is doped with further rare-earth metal oxides selected from the group consisting of yttrium oxide, lanthanum oxide, praseodymium oxide, neodymium oxide and mixtures thereof.

10. Catalytically active particle filter comprising a wall-flow filter substrate and a catalytically active coating for carrying out the method according to claim 5,
characterized
in that the catalytically active coating comprises one or more nitrogen oxide storage materials.

11. Catalytically active particle filter according to claim 10,
characterized
in that the nitrogen oxide storage material comprises one or more nitrogen oxide storage components selected from the group of oxides, hydroxides, oxyhydroxydes and carbonates of the alkali metals, of the earth alkali metals and of the rare-earth metals.

* * * * *